US009563866B2

(12) United States Patent
Mehta et al.

(10) Patent No.: US 9,563,866 B2
(45) Date of Patent: Feb. 7, 2017

(54) ESTIMATING A COMPUTING JOB COMPLEXITY

(75) Inventors: Dharmesh Rajendra Mehta, Mumbai (IN); Sudha Sahasrabudhe, Naupada Thane (West) (IN); Shagufta Shashank Kohli, Mumbai (IN); Anu Tayal, Chandigarh (IN); Vineet Tiyagi, Pin (IN); Shalini Agarwal, Mumbai (IN); Santosh Ray, India Thane West (IN); Satyendra Chauhan, Satna-M.P. (IN); Kalamalla Basha, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 1214 days.

(21) Appl. No.: 12/754,386

(22) Filed: Apr. 5, 2010

(65) Prior Publication Data

US 2010/0257116 A1 Oct. 7, 2010

(30) Foreign Application Priority Data

Apr. 6, 2009 (IN) ........................... 918/MUM/2009

(51) Int. Cl.
*G06Q 10/00* (2012.01)
*G06Q 10/06* (2012.01)

(52) U.S. Cl.
CPC ........ *G06Q 10/06315* (2013.01); *G06Q 10/06* (2013.01); *G06Q 10/063* (2013.01); *G06Q 10/067* (2013.01); *G06Q 10/0631* (2013.01); *G06Q 10/06313* (2013.01)

(58) Field of Classification Search
CPC .............. G06Q 10/063; G06Q 10/0631; G06Q 10/06313; G06Q 10/06315
See application file for complete search history.

(56) References Cited

U.S. PATENT DOCUMENTS

| | | | | |
|---|---|---|---|---|
| 6,339,775 | B1 * | 1/2002 | Zamanian et al. | |
| 2003/0192028 | A1 * | 10/2003 | Gusler et al. | 717/101 |
| 2004/0186757 | A1 * | 9/2004 | Starkey | 705/7 |
| 2005/0060307 | A1 * | 3/2005 | Tran | 707/4 |
| 2005/0160101 | A1 * | 7/2005 | Gallagher et al. | 707/100 |
| 2008/0313595 | A1 * | 12/2008 | Boulineau et al. | 717/101 |
| 2010/0046546 | A1 * | 2/2010 | Ram et al. | 370/468 |

OTHER PUBLICATIONS

L. Briand, I. Wieczorek, Resource Estimation in Software Engineering, Second edition of the Encyclopedia of Software Engineering, Wiley, (Editor: J. Marciniak), 2002.*

* cited by examiner

*Primary Examiner* — William Brockington, III
(74) *Attorney, Agent, or Firm* — Mannava & Kang, P.C.

(57) ABSTRACT

In a method for estimating a complexity of a computing job, selected data objects relevant to a data repository are retrieved. In addition, points are assigned to multiple elements of the selected data objects according to a predefined schedule and scores for the selected data objects are calculated by applying a mathematical function to the multiple elements and complexities of the data objects are estimated based upon the calculated scores and the predefined schedule. In addition, a complexity of the computing job is estimated based upon the estimated complexities of the data objects and the estimated complexity of the computing job is stored.

26 Claims, 12 Drawing Sheets

PREDEFINED SCHEDULE 500

502

504

| TRANSFORMATION | POINTS |
| --- | --- |
| SOURCE | 0 |
| TARGET | 0 |
| SOURCE QUALIFIER | 0 |
| UPDATE STRATEGY | 2 |
| EXPRESSION | 1 |
| STORED PROCEDURE | 2 |
| SEQUENCE | 1 |
| EXTERNAL PROCEDURE | 3 |
| AGGREGATOR | 2 |
| FILTER | 1 |
| LOOKUP PROCEDURE | 2 |
| JOINER | 2 |
| NORMALIZER | 3 |
| SESSION OBSOLETE | 2 |
| RANK | 2 |
| FTP OBJECT | 2 |
| ORACLE EXTERNAL LOADER OBJECT | 3 |
| SYBASE IQ EXTERNAL LOADER OBJECT | 3 |
| SYBASE IQ 12 EXTERNAL LOADER OBJECT | 3 |
| TERA DATA EXTERNAL LOADER OBJECT | 3 |
| MAPPLET | 3 |

*FIG. 5A*

PREDEFINED SCHEDULE 510

512 514

| TRANSFORMATION | POINTS |
|---|---|
| DATA SET STAGE | 1 |
| CSEQFILESTAGE | 1 |
| FILE SET STAGE | 1 |
| LOOKUP FILE SET STAGE | 2 |
| EXTERNAL SOURCE STAGE | 2 |
| EXTERNAL TARGET STAGE | 2 |
| COMPLEX FLAT FILE STAGE | 2 |
| SAS DATA SET STAGE | 2 |
| PxDB2 | 2 |
| ORACLE ENTERPRISE STAGE | 2 |
| TERADATA ENTERPRISE STAGE | 2 |
| INFORMIX ENTERPRISE STAGE | 2 |
| CTRANSFORMER STAGE | 2 |
| BASIC TRANSFORMER STAGE | 3 |
| AGGREGATOR STAGE | 3 |
| JOIN STAGE | 2 |
| MERGE STAGE | 2 |
| LOOKUP STAGE | 2 |
| PxSORT | 2 |

*FIG. 5B*

PREDEFINED SCHEDULE 520

522 → ← 524

| SQL LENGTH | | POINTS |
|---|---|---|
| 1 | 75 | 3 |
| 76 | 250 | 6 |
| 251 | 600 | 10 |
| 601+ | | 20 |

FIG. 5C

COMPLEXITY SCHEDULE 530

532 → ← 534

| POINTS RANGE | | COMPLEXITY |
|---|---|---|
| 0 | 7 | SIMPLE |
| 8 | 13 | MEDIUM |
| 14 | 25 | COMPLEX |
| 26+ | | VERY COMPLEX |

FIG. 5D

SUMMARY SPREADSHEET 540

| FOLDER NAME | MAPPING NAME | TRANS-FORMATION POINTS | SQL OVERRIDE POINTS | TOTAL POINTS | COMPLEXITY CATEGORY |
|---|---|---|---|---|---|
| FOLDER 1 | MAPPING 1 | 2 | 0 | 2 | SIMPLE |
| FOLDER 1 | MAPPING 2 | 2 | 0 | 2 | SIMPLE |
| FOLDER 1 | MAPPING 3 | 4 | 5 | 9 | MEDIUM |
| FOLDER 1 | MAPPING 4 | 10 | 2 | 12 | MEDIUM |
| FOLDER 1 | MAPPING 5 | 2 | 0 | 2 | SIMPLE |
| FOLDER 1 | MAPPING 6 | 15 | 2 | 17 | COMPLEX |
| FOLDER 1 | MAPPING 7 | 0 | 0 | 0 | SIMPLE |

*FIG. 5E*

PREDEFINED SCHEDULE 600

602

604

606

| CRITERIA | SIMPLE | MEDIUM | COMPLEX | POINTS (%) |
|---|---|---|---|---|
| BO UNIVERSE | | | | |
| NO. OF TABLES/VIEWS | 20 | 30 | 30+ | 25 |
| NO. OF CLASSES | 15 | 20 | 20+ | 3 |
| NO. OF OBJECTS | 300 | 600 | 600+ | 15 |
| NO. OF CONDITIONAL OBJECTS | 10 | 20 | 20+ | 10 |
| NO. OF CONTEXTS | 2 | 5 | 5+ | 10 |
| NO. OF ALIASES | 2 | 5 | 5+ | 5 |
| NO. OF OBJECTS USING AGGREGATE AWARENESS FUNCTION | 0 | 5 | 5+ | 10 |
| NO. OF CUSTOM HIERARCHIES DEFINED | 0 | 2 | 2+ | 5 |
| NO. OF LINED UNIVERSES | 0 | 1 | 1+ | 10 |
| NO. OF LOVS ATTACHED | 20.00% | 40.00% | 40.00%+ | 5 |
| NO.OF SHORT CUT JOINS | 2 | 5 | 5+ | 2 |

FIG. 6A

PREDEFINED SCHEDULE 610

616

614

612

| CRITERIA | SIMPLE | MEDIUM | COMPLEX | POINTS (%) |
|---|---|---|---|---|
| BO REPORTS | | | | |
| NO. OF TABLES/VIEWS | 2 | 6 | 6+ | 15 |
| NO. OF TABLES IN B0 REPORT | 2 | 4 | 4+ | 7 |
| NO. OF CROSS TABS | 1 | 4 | 4+ | 5 |
| NO. OF CHARTS | 1 | 2 | 2+ | 4 |
| NO. OF SECTIONS/GROUPING LEVEL./MASTER-DETAIL SECTIONS | 0 | 3 | 3+ | 5 |
| NO. OF DATAPROVIDER | 2 | 5 | 5+ | 10 |
| NO. OF ALERTERS/RANKING USED | 2 | 5 | 5+ | 5 |
| NO. OF OBJECTS | 15 | 25 | 25+ | 10 |
| NO. OF VBA MACROS | 0 | 2 | 2+ | 5 |
| NO. OF PAGES IN REPORT | 200 | 1000 | 1000+ | 10 |
| NO. OF SUB-REPORTS | 0 | 3 | 3+ | 5 |
| NO. OF SUMMARIES/ FORMULAES/ VARIABLES USED | 4 | 7 | 7+ | 5 |
| NO. OF SORT OPTIONS | 1 | 4 | 4+ | 2 |
| NO. OF REPORT LEVEL FILTERS | 1 | 4 | 4+ | 5 |
| NO. OF USER DEFINED SQL, STORED PROCS, ETC. | 0 | 1 | 1+ | 5 |
| NO. OF PROMPTS | 3 | 6 | 6+ | 2 |

*FIG. 6B*

ESTIMATING A COMPUTING JOB COMPLEXITY

CROSS-REFERENCES

The present application shares some common subject matter with co-pending and commonly assigned U.S. patent application Ser. No. 11/874,542, entitled “Complexity Estimation of Data Objects”, filed on Oct. 18, 2007, by Christopher Killian et al., the disclosure of which is hereby incorporated by reference in its entirety.

BACKGROUND

Organizations typically receive enormous amounts of data from external sources and/or create large amounts of data internally on a daily basis. The data is often stored in a data warehouse, which is an electronic database typically residing in servers. In essence, such a data warehouse constitutes the institutional “memory” of an organization that may be accessed as desired to gain insight into the operation, culture, and performance of the organization.

There exists a number of software tools or suites, typically implemented using a database management system (DBMS), that supports queries into the data warehouses to provide business intelligence to the organizations. As referred herein, business intelligence includes applications and technologies that work together to collect, provide access to, and analyze data and information about operations of an organization. Thus, an organization often implements a business intelligence software application in its operations to obtain a more comprehensive knowledge of the factors affecting their business, such as metrics (that is, data measurements) on sales, production, human resources, and other internal operations to enable the organization to make better business decisions. Examples of commercially-available business intelligence software applications include but are not limited to: BusinessObjects™ of Business Objects, S.A., Paris, France; MicroStrategy 8™ of MicroStrategy Inc., McLean, Va.; and Hyperion Intelligence™ of Hyperion Solutions Corp., Santa Clara, Calif.

Business intelligence software or applications (hereinafter, “BI applications”) typically include multiple components for providing report creation, data viewing, and data distribution in one or more databases of interest. For example, the BI applications allow so-called “reports” in which various components of the stored data may be organized and presented in a desired format to be developed, for instance, in a single document. The BI applications also allow so-called “universes” that describe the structure, content, organization, internal relationships, etc., of various databases to be developed. The BI applications may generate the “universes” as metadata layers which interface with databases to map everyday business terms to the data stored in the databases. In addition, the “universes” simplify the processes of creating reports, viewing data and distributing data by providing an easy way to see and understand the data contained in the databases. The reports and universes are specific examples of data objects used to interact with an organization’s data warehouse.

The data objects rely upon the architectures of the underlying applications used to create and execute them. If these applications are changed substantially, an organization’s investment made in its data objects may be lost, or substantially increased, to the extent that the organization must either abandon or re-author the desired data objects. This may be a substantial loss because organizations often develop hundreds, if not thousands, of data objects used to interact with the data warehouse. However, rather than re-authoring the data objects entirely, it is possible to transform pre-existing data objects to be compatible with the revised, underlying applications. In addition, it is possible to determine the complexities of the data objects through use of conventional techniques.

It would, however, be beneficial to have improved techniques for determining the complexities of the data objects.

SUMMARY

The present disclosure describes a method for estimating a complexity of a computing job that improves upon conventional complexity estimation techniques. In the method, selected data objects relevant to a data repository are retrieved, where each of the selected data objects is formed of multiple elements. Points are assigned to the multiple elements according to a predefined schedule. The predefined schedule may include point value assignments for the multiple elements that are based upon a user’s historical knowledge of the relevance each of the multiple elements has over the selected data objects. In addition, scores for the selected data objects are calculated by applying a mathematical function to the multiple elements. In certain instances, the mathematical function is applied to both the points and the multiple elements in calculating the scores. Moreover, complexities of the data objects are estimated based upon the calculated scores and the predefined schedule and a complexity of the computing job is estimated based upon the estimated complexities of the data objects. The estimated complexity of the computing job is further stored, for instance, in a computer accessible device.

BRIEF DESCRIPTION OF THE DRAWINGS

Embodiments are illustrated by way of example and not limited in the following figure(s), in which like numerals indicate like elements, in which:

FIG. 5A-5C, respectively, illustrate predefined schedules that may be used in estimating complexities of data objects, in accordance with embodiments of the invention;

FIG. 5D illustrates a complexity schedule that may be used in estimating a complexity of a computing job, in accordance with an embodiment of the invention;

FIG. 5E illustrates a summary spreadsheet of complexity levels of particular data objects, in accordance with an embodiment of the invention;

FIGS. 6A and 6B, respectively, illustrate a predefined schedule of universe components and a predefined schedule of report components, in accordance with an embodiment of the invention.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

System

Figure 1:
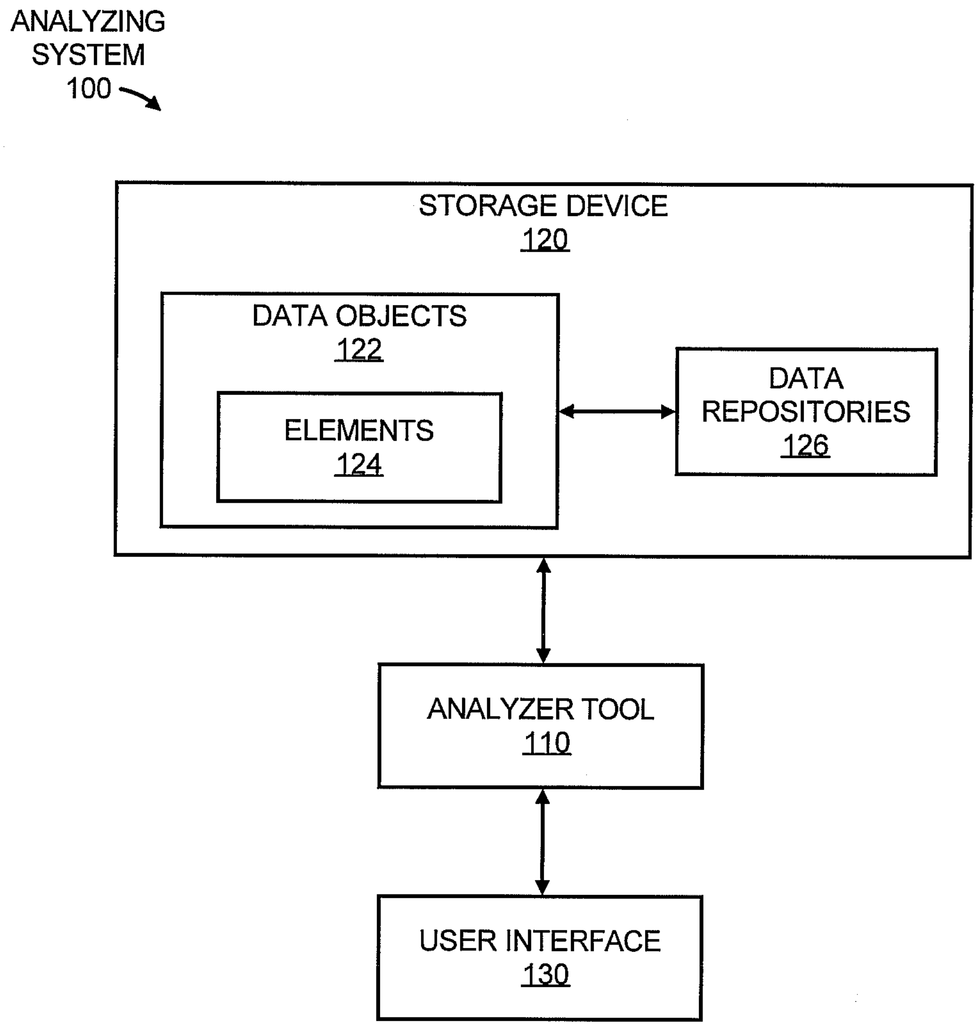
FIG. 1 illustrates a system for analyzing a computing job, in accordance with an embodiment of the invention.

FIG. 1 illustrates a system 100 for analyzing a computing job, according to an embodiment. It should be understood that the system 100 may include additional elements and that some of the elements described herein may be removed and/or modified without departing from a scope of the system 100.

The system 100 is depicted as including an analyzer tool 110 in communication with a storage device 120 storing data objects 122 and data repositories 126. The analyzer tool 110 is also depicted as being in communication with a user interface 130. Each of the data objects 122 is formed of a plurality of elements 124 and is relevant to one or more of the data repositories 126. For instance, each of the data objects 122 may be considered as being relevant to a particular data repository 126 if the data object 122 is used to access, manipulate, organize, operate upon or present, etc., data stored in the particular data repository 126 or particular ones of the data repositories 126. By way of particular example, a data object 122, such as, a report or a universe pertaining to data contained in a particular data repository 126 may be considered as being relevant to that data repository 126 or particular ones of the data repositories 126 and vice versa.

The analyzer tool 110 may be implemented to analyze the data objects 122 stored in the storage device 120 to, for instance, estimate a complexity of a computing job involving the data objects 122. Generally speaking, the computing job may comprise a computer-implemented operation involving a manipulation or a transformation of the data objects 122. Thus, in one particular example, the analyzer tool 110 may be operated to estimate the complexity of a computing job in which selected data objects 122 relevant to one or more data repositories are transformed to be compatible with a revised set of applications.

The analyzer tool 110 may receive input from a user through the user interface 130. The input may comprise various sets of instructions for the analyzer tool 110 to implement or execute. In addition, the input may comprise values that the analyzer tool 110 may assign to the elements 124 in estimating the complexities of the data objects 122. Various manners in which the analyzer tool 110 may implement the values received from a user through the user interface 130 are described in detail herein below.

According to an example, the storage device 120, which may comprise any type of machine-readable memory or the like, may be local to a processing apparatus implementing the analyzer tool 110. In another example, the storage device 120 is remote from the analyzer tool 110, as in the case of a remote server computer or the like. Generally speaking, a "data object" as used throughout the present disclosure may be defined to include virtually any item that may be used to access, manipulate, organize, operate upon or present data stored in a data warehouse including, but not limited to, reports and universes created using Business Objects authoring tools. For example, so-called "reports" may be developed using Business Objects' Desktop Intelligence application which allows users, among other things, to define a preferred layout of various data stored within the data warehouse 104. In a similar vein, a so-called "universe" may be defined as a metadata (or semantic) layer that may be developed using Business Objects' Universe Designer application to describe the location of one or more databases, the types of data stored within such databases, the internal relationships between data elements within such databases, etc., thereby allowing relevant queries to be established for the databases.

As described in greater detail below, the analyzer tool 110 may be implemented using stored instructions that may be executed by a suitable processing apparatus, such as a computing device. The user interface 130 may include a graphical user interface presented to a user via a suitable display device. The analyzer tool 110 may obtain values for various elements 124 forming the data objects 122 via the user interface 130. In one regard, the use of the user-input values for the elements 124 generally enables the overall complexity ratings for each analyzed data object 122 to be estimated, which may be employed to estimate efforts required to transform individual or groups of analyzed data objects 122.

Figure 2:
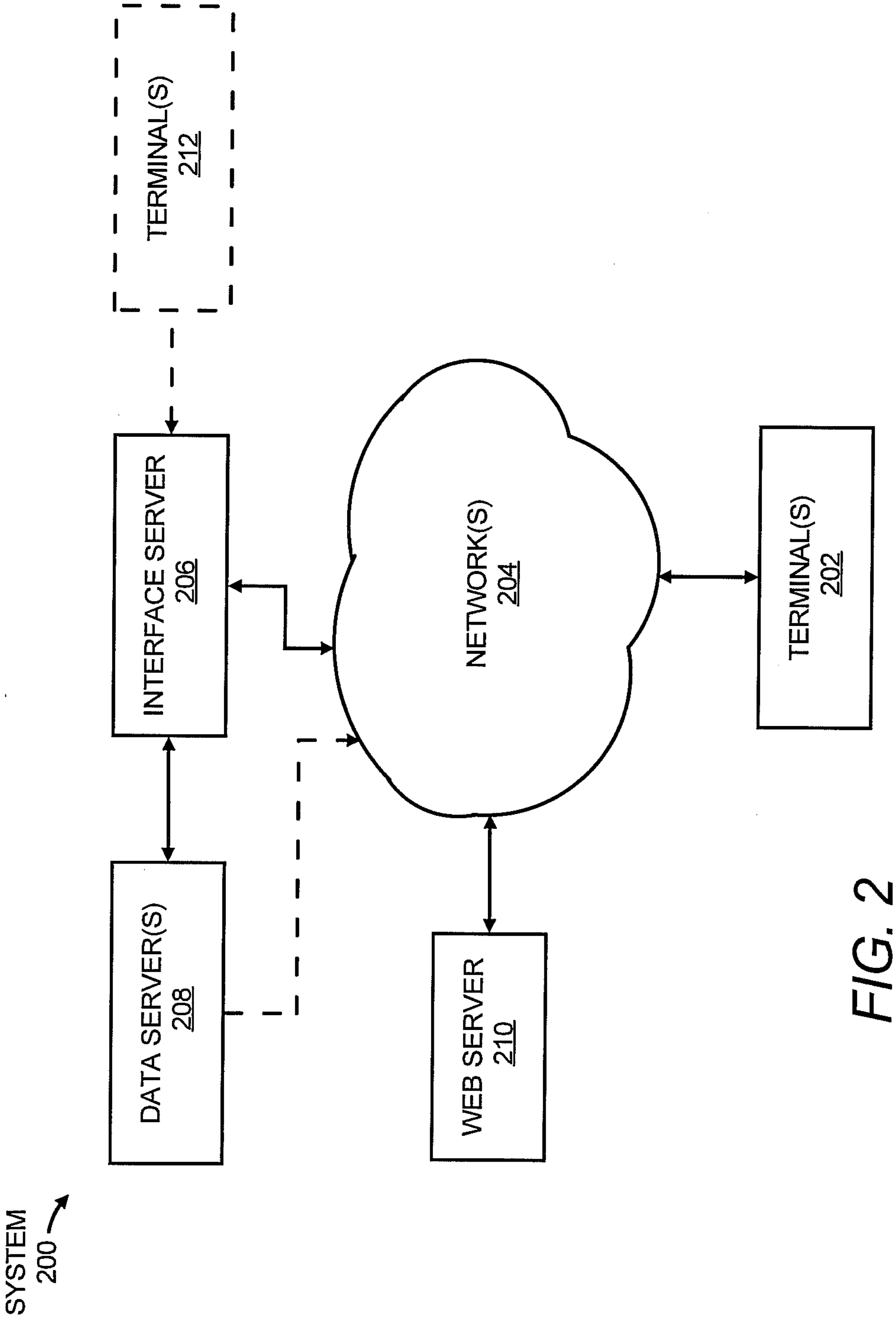
FIG. 2 illustrates a system in accordance with an embodiment of the invention.

Referring now to FIG. 2, a system 200 in accordance with an embodiment is illustrated. It should be understood that the system 200 may include additional elements and that some of the elements described herein may be removed and/or modified without departing from a scope of the system 200.

As shown, the system 200 includes one or more user terminals 202 in communication with a communication network 204. Also shown in the system 200 are an interface server 206 and one or more data server(s) 208 in communication with the communication network 204. As described in greater detail below, each of the terminal(s) 202 may include a suitable processing apparatus capable of implementing the processing described below. Additionally, each of the terminal(s) 202 includes the necessary hardware and/or software needed to communicate with the network 204 via a wired and/or a wireless connection. Thus, the terminal(s) 202 may be embodied by desktop/laptop/handheld computers, wireless communication devices, personal digital assistants or any other similar devices having the necessary processing and communication capabilities. In an embodiment, the network 204 may comprise a public communication network such as the Internet or World Wide Web and/or a private communication network such as a local area network (LAN), wide area network (WAN), etc., as known by those having ordinary skill in the art.

The interface server 206 and the data server(s) 208, which may comprise suitable server computers as known in the art, collectively implement the functionality of the at least one storage device 120 illustrated in FIG. 1. For example, the interface server 206 may implement a suitable DBMS that is compatible with Business Objects reports and universes. Such software is provided to serve as an interface to the various data servers 208 that, in turn, implement a data warehouse. As described below, each of the terminals 202 may comprise client software applications that allow the terminals 202 to communicate with the one or more servers

206-208 via the intervening communication networks 204. The data objects operated upon as described herein are preferably stored on either the interface server 206 or, more typically, locally on the terminals 202.

In an alternative embodiment, at least some portion of the functionality described below relative to the terminals 202 may be implemented by one or more web servers 210 connected to the communication network 204. The web servers 210 may provide a suitable interface to the terminal 202 via the communication network 204, while performing the necessary processing needed to implement the analyzer tool 110 described herein. In this manner, a more centralized implementation is possible. In a further alternative embodiment, another terminal 212, similar in construction and functionality as the network-based terminals 202, may be provided. In this embodiment, the other terminal(s) 212 communicates directly with the interface server 206, bypassing the network 204. In addition, although the data server(s) 208 are described above as implementing a data warehouse, they may be equally employed as storage for operational data, that is, data not yet stored in a data warehouse.

Figure 3:
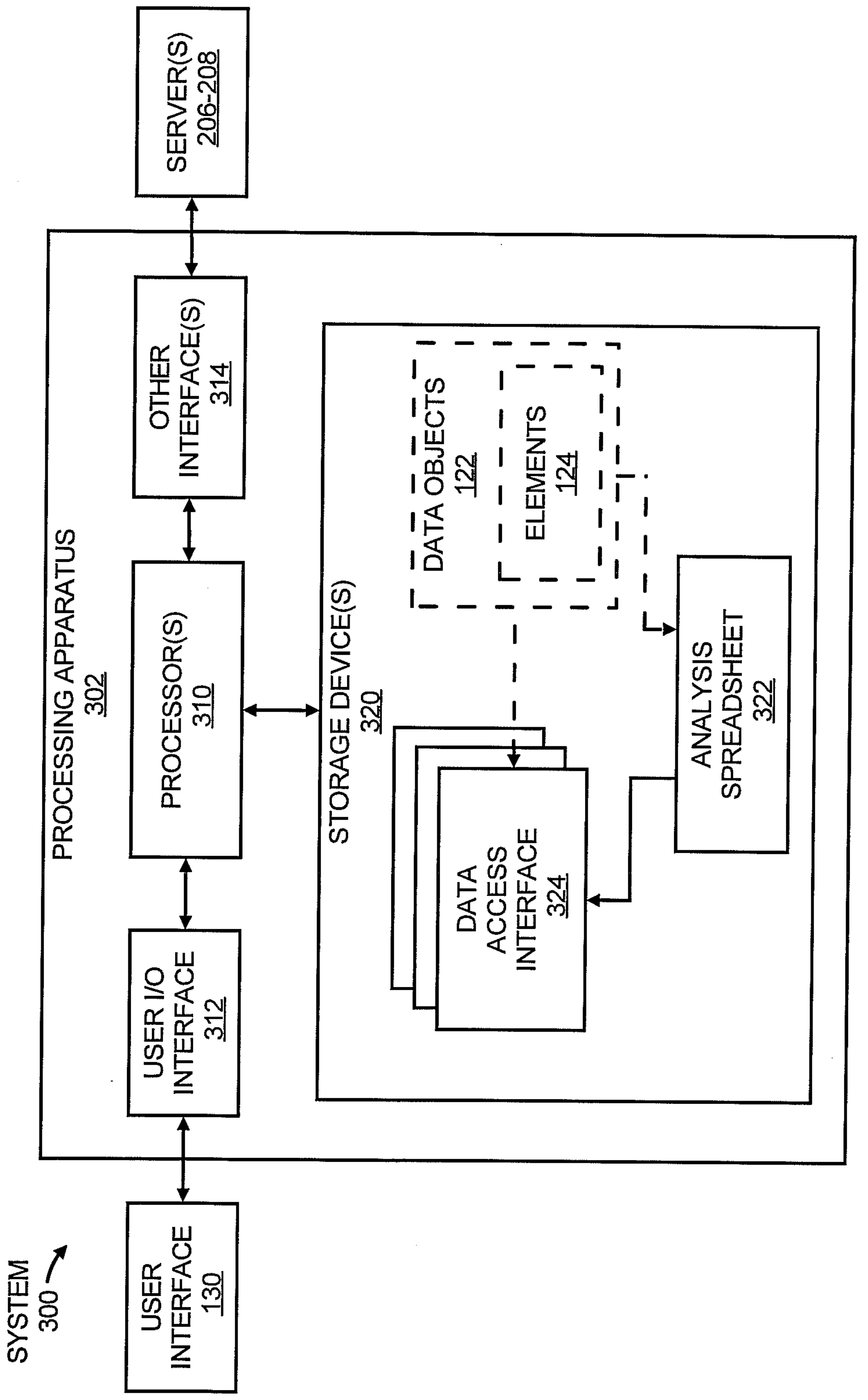
FIG. 3 illustrates a block diagram of a system containing a processing apparatus, suitable for implementing the terminals illustrated in FIG. 2, in accordance with an embodiment of the invention.

Referring now to FIG. 3, there is shown a block diagram of a system 300 containing a processing apparatus 302, suitable for implementing the terminals 202, 212 illustrated in FIG. 2, according to an embodiment. It should be understood that the system 300 may include additional elements and that some of the elements described herein may be removed and/or modified without departing from a scope of the system 300.

As shown, the processing apparatus 302 includes one or more processors 310 in communication with one or more storage devices 320. The processor(s) 310 may comprise a microprocessor, microcontroller, digital signal processor, co-processor or other similar devices known to those having ordinary skill in the art. In addition, the storage device(s) 320 may comprise a combination of volatile or nonvolatile memory such as random access memory (RAM) or read only memory (ROM). Such storage devices 320 may be embodied using any currently known media such as magnetic or optical storage media including removable media such as floppy disks, compact discs, etc. In any regard, the storage device 320 has stored thereon instructions that may be executed by the one or more processors 310, such that the processor(s) 310 implement the functionality described herein. In addition, or alternatively, some or all of the software-implemented functionality of the processor(s) 310 may be implemented using firmware and/or hardware devices such as application specific integrated circuits (ASICs), programmable logic arrays, state machines, etc.

The processor(s) 310 may access one or more databases of interest stored on the storage device(s) 320 via a universe (not shown). The universe is a metadata layer or database interface that is logically situated above the storage device(s) 320 to provide an interface to the database. The universe maps common terms to the data in the storage device(s) 320 through the creation of data classes and objects in the universe for the data structures, such as data tables, in the storage device(s) 320. Objects represent fields in a database table or other data structure, classes are logical groupings of objects, and the universe is a collection of classes. Thus, the universe simplifies the process of querying, accessing, and retrieving the structured collection of records or data in the storage device(s) 320 by providing automatic joins between the database tables based on predetermined key values or parameters.

As further shown in FIG. 3, the processor(s) 310 may be in communication with various user interface devices 130 via a user input/output interface 312 that allows a user of the processing apparatus 302 to interact therewith. For example, the user interface devices 130 may comprise one or more display screens, keyboards, user selection devices (for instance, a mouse and cursor combination, a touch screen, voice recognition interfaces, etc.), speakers, microphones, etc. The processor(s) 310 may also be in communication with other interfaces 314 that provide one or more communication interfaces between the processing apparatus 302 and external devices, such as the network 204 and/or the servers 206-208 illustrated in FIG. 2. The nature of the other interfaces 314 necessarily depends on the external devices with which the processing apparatus 302 is configured to communicate. For example, where the processing apparatus 302 is coupled to a network (such as network 204) via a wired connection, the interfaces 314 may comprise the software, firmware and/or hardware necessary to terminate the relevant network protocols. Similarly, where the processing apparatus 302 communicates with a wireless network, the interfaces 314 may comprise the components needed to terminate the wireless protocol.

The storage devices 310 comprise executable instructions that may be used to implement an analysis spreadsheet 322 as well as one or more data access interface programs 324. According to an embodiment, the analysis spreadsheet 322 may be implemented using a known spreadsheet application such as the Microsoft Excel™ spreadsheet program. In a similar vein, the data access interfaces 324 may be implemented using Business Objects' Desktop Intelligence client or Business Objects' Universe Designer client. The data access interface programs 324 may also comprise customized data mining software capable, using known programming techniques, of directly analyzing the data objects 122. Further still, such customized data mining software may cooperate with application programming interfaces (APIs) of the commercial clients (for instance, Desktop Intelligence or Universe Designer) for the same purpose. In combination, the analysis spreadsheet 322 and the data access interface(s) 324 implement that functionality of the analyzer tool 110 used to estimate the complexities of one or more data objects 122 based upon the particular elements 124 forming the data objects 122. In particular, the data access interface(s) 324 may access the targeted data objects 122 and obtain the elements 124 forming the targeted data objects 122 and the values assigned to the elements 124. In turn, the analysis spreadsheet 322 operates upon values obtained by the data access interface 324 from the data objects 122.

To the extent that the data objects 122 are stored remotely relative to the processing apparatus 302, the data access interface(s) 324 accesses the data objects 122 via one of the other interfaces 314 implemented within the processing apparatus 302. In an alternative embodiment, the desired data objects 122 may be stored in the storage device(s) 320 thereby allowing direct analysis by either the analysis spreadsheet 322 or the data access interface 324.

Process

Figure 4A:
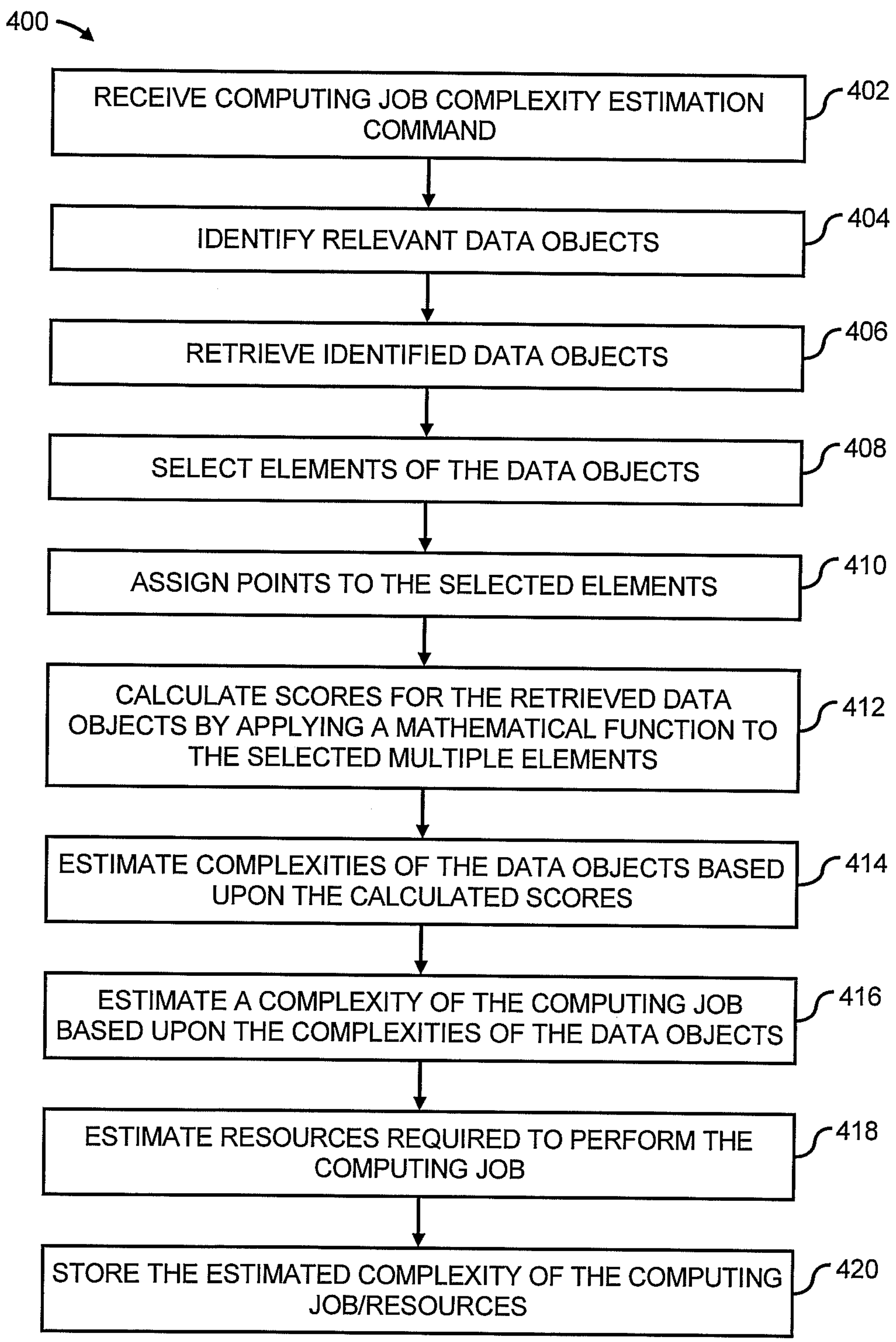
FIG. 4A illustrates a flow diagram of a method for estimating a complexity of a computing job, in accordance with an embodiment of the invention.

With reference now to FIG. 4A, there is shown a flow diagram of a method 400 for estimating a complexity of a computing job, according to an embodiment. It should be apparent to those of ordinary skill in the art that the method 400 represents generalized illustrations and that other steps may be added or existing steps may be removed, modified or rearranged without departing from the scopes of the method 400.

The description of the method 400 is made with reference to the system 300 illustrated in FIG. 3, and thus make reference to the elements cited therein. In this regard, the processing apparatus 302, and more particularly, the processor(s) 310, is configured to implement the method 400, unless otherwise noted.

At step 402, the processing apparatus 302 initiates the method 400 through receipt of a command through the user interface 130 to estimate a complexity of a particular computing job. According to an example, the particular computing job comprises, for instance, a computer-implemented operation involving a manipulation or a transformation of the data objects 122 such that the data objects 122 may be implemented with a revised set of applications.

At step 404, the processor(s) 310 identifies which of the data objects 122 stored on the storage device(s) 320, or data repositories 126, are relevant to the computing job. According to an example, the processor(s) 310 may identify all of the data objects 122 contained in one or more storage devices 320 to be relevant to the computing job. In another example, the processor(s) 310 may identify all of the data objects 122 having predetermined file extensions, such as reports (.rep) or universes (.unv) as being relevant to the computing job.

In a further example, a correlation between the data objects 122 and the computing job may have previously been made by a user and the processor(s) 310 may receive the identification of the particular data objects 122 from the user through the user interface 130. In this example, the user may rely upon historical interactions with the data objects 122 and various computing jobs to determine which of the data objects 122 are relevant to the particular computing job. In addition, the user may store information pertaining to the data objects 122 considered to be relevant to a particular computing job in the storage device(s) 320, which the processor(s) 310 may access at step 404 to identify the data objects 122 that are relevant to the computing job.

At step 406, the processor(s) 310 retrieves the identified data objects 122 from the one or more storage devices 320. According to an example, the processor(s) 310 physically moves the data objects 122 from one location in the storage device(s) 320 to another location in the storage device(s) 320 for processing. In another example, the processor(s) 310 is configured to analyze the relevant data objects 122 without moving them from their respective locations in the storage device(s) 320, in which case, the retrieval performed at step 406 is merely a designation of which of the data objects 122 the processor(s) 310 is configured to analyze.

At step 408, the processor(s) 310 selects elements 124 of each of the data objects 122 retrieved at step 406 to be analyzed. Each of the data objects 122 may be formed by a plurality of elements 124. By way of particular example in which the data objects 122 comprise mappings, the elements 124 are transformations of the mappings.

According to a first example, the processor(s) 310 selects all of the elements 124 forming each of the retrieved data objects 122 at step 408. In another example, the processor(s) 310 selects a particular subset of the elements 124 for each of the retrieved data objects 122. In this example, the processor(s) 310 may be programmed to determine which of the elements 124 are more relevant to the data objects 122 than other elements 124. For instance, the processor(s) 310 may select those elements 124 that affect the data objects 122 to a predefined level or require a predefined level of resources at step 408.

As a further example, a user may identify the subsets of all of the elements 124 forming the retrieved data objects 122 to be selected at step 408. In this example, the user may rely upon historical interactions with the various elements 124 of the data objects 122 to identify which of the elements 124 should be selected at step 408. As such, the elements 124 may be selected based upon a user's subjective criteria, which may also be based upon the user's experience with the data objects.

At step 410, the processor(s) 310 assigns points to the multiple elements 124 of the data objects 122 retrieved at step 406 according to a predefined schedule. According to an example, the predefined schedule contains an indication that each of the elements 124 has the same point values, in which the processor(s) 310 assigns those same point values to each of the elements 124. In another example, the predefined schedule includes one of multiple values that may be assigned to the elements 124. In this example, a user may define the values that are to be assigned to the elements 124 in the predefined schedule, for instance, based upon knowledge of the relative importance levels of the elements 124 to the data objects 122, which may be attained through historical interactions with the elements 124 and the data objects 122.

At step 412, the processor(s) 310 calculates scores for each of the retrieved data objects 122 by applying a mathematical function to the selected elements 124. In some embodiments, the processor(s) 310 also calculates the scores based upon the points assigned to the selected elements 124. The mathematical function may include one or more of an addition function, a subtraction function, a multiplication function, a division function, etc. In one embodiment, the mathematical function may be applied to the selected elements 124 for each of the data objects 122 to thus enable some of the selected elements 124 to be weighted more heavily as compared with other ones of the selected elements 124 of each of the data objects 122. Particular examples in which the mathematical function may be applied to calculate the scores at step 412 will be described in greater detail herein below.

At step 414, the complexities of the retrieved data objects 122 are estimated based upon the calculated scores of the data objects 122. In one embodiment, the complexities of the data objects 122 are estimated based upon a predefined schedule that assigns a complexity level to the data objects 122 based upon their respective scores. Thus, for instance, a first range of scores may be defined to be equivalent to a low complexity data object 122 transformation, a second range of scores may be defined to be equivalent to a medium complexity data object 122 transformation, a third range of scores may be defined to be equivalent to a complex data object 122 transformation, a fourth range of scores may be defined to be equivalent to a very complex data object 122 transformation, etc.

At step 416, a complexity of the computing job is estimated based upon the estimated complexities of the data objects 122. According to an embodiment, the computing job is estimated to have a complexity level that is equivalent to a mathematical function of the estimated data object 122 complexity levels. The mathematical function may be the median, mean, average, the highest estimated complexity level, the lowest estimated complexity level, etc., of the estimated complexities of the data objects 122.

At step 418, the processors(s) 310 may employ the estimated complexity of the computing job in estimating the amount of resources, including, for instance, computing resources, personnel, etc., required to perform the computing job. By way of particular example, the data objects 122 may have been developed for applications used by a client and the processing apparatus 302 may be implemented by a user, who may be a prospective contractor wishing to use manipulated or transformed versions of the data objects 122 for applications used by the contractor in performing services for the client. In this example, the client may have requested that the user submit a bid for the services to be performed by the user. In developing the bid, the user may use the processing apparatus 302 to estimate the complexity and/or the amount of resources required to perform the computing job and to base the bid amount on the estimated complexity and/or the estimated amount of resources.

At step 420, the processor(s) 310 stores the estimated complexity of the computing job and/or the estimated resources required to perform the computing job in a storage location, such as, the storage device 320, an external storage device, one or more of the servers 206-208, etc.

Figure 4B:
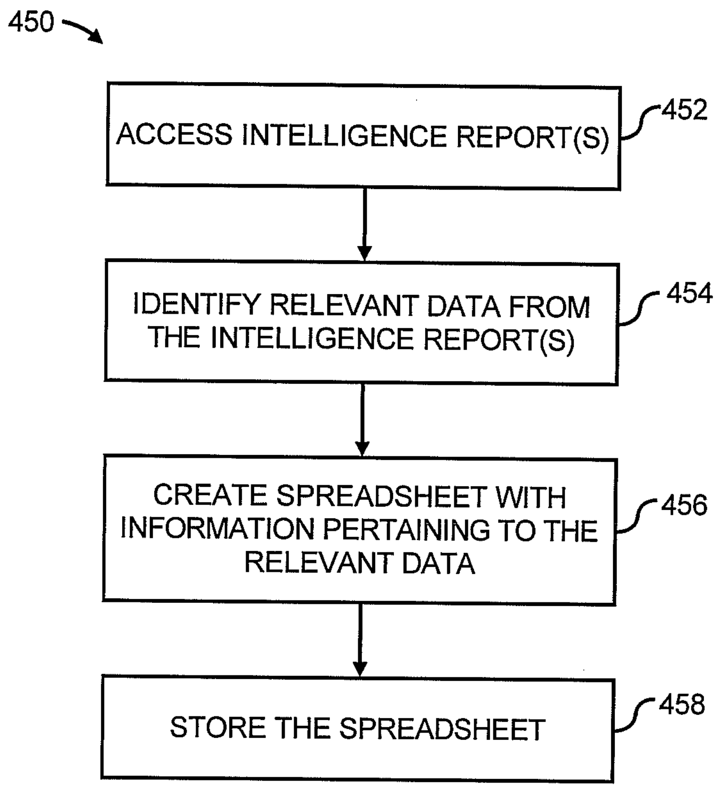
FIG. 4B illustrates a flow diagram of a method of documenting existing intelligence reports into a standard spreadsheet format, in accordance with an embodiment of the invention.

Turning now to FIG. 4B, there is shown a flow diagram of a method 450 of documenting existing intelligence reports into a standard spreadsheet format, according to an embodiment. It should be apparent to those of ordinary skill in the art that the method 450 represents generalized illustrations and that other steps may be added or existing steps may be removed, modified or rearranged without departing from the scopes of the method 450.

Generally speaking, the processor(s) 310 may implement the method 450 prior to performing the method 400 to, for instance, create spreadsheet(s) containing information pertinent to the data objects 122 that the processor(s) 310 may access in implementing the method 400. More particularly, for instance, the processor(s) 310 may access the spreadsheet(s) created through implementation of the method 450 in identifying the data objects 122 and the elements 124 and, in certain instances, determining the counts of each of the elements 124 contained in the data objects 122. In one respect, the method 450 generally provides the processor(s) 310 with a relatively quick and easy location from which to retrieve information during a process for estimating a complexity of a computing job.

At step 452, the processor(s) 310 accesses one or more intelligence reports. The one or more intelligence reports may comprise either or both of web intelligence (webi) reports and desk intelligence (deski) reports. At step 454, the processor(s) 310 identifies relevant data from the intelligence reports. The relevant data may include, for instance, all of the elements 124 of one or more particular data objects 122. By way of example, the relevant data may include the transformations and SQL overrides of a mapping contained in an intelligence report. In this example, the relevant data may also include a summary count of the transformations and the SQL override lengths.

At step 456, the processor(s) 310 creates a spreadsheet with information pertaining to the relevant data identified at step 454. By way of example, the processor(s) 310 creates the spreadsheet to contain a listing of the elements 124 of one or more data objects 122 contained in the intelligence report(s) along with a summary count of each of the elements 124. As another example, the processor(s) 310 creates the spreadsheet to contain a listing of universe components and report components of BO universes and BO reports along with a summary count of the universe components and the report components.

At step 458, the processor(s) 310 stores the spreadsheet in the storage device 320.

Some or all of the operations set forth in the methods 400 and 450 may be contained as utilities, programs, or subprograms, in any desired computer accessible medium. In addition, some or all of operations may be embodied by computer programs, which may exist in a variety of forms both active and inactive. For example, they may exist as software program(s) comprised of program instructions in source code, object code, executable code or other formats. Any of the above may be embodied on a computer readable storage device.

Exemplary computer readable storage devices include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

EXAMPLES

The methods 400 and 450 may be applied to various types of environments. An example of a suitable environment includes an environment containing databases structured with data integration products available from the Informatica Corporation of Redwood City, Calif. Another example of a suitable environment includes an environment containing universes and reports. A further example of a suitable environment includes an environment containing databases structured with the DataStage™ product available from the IBM Corporation of Armonk, N.Y. A still further example of a suitable environment includes an environment operable with database management products available from Ab Initio™ of Lexington, Mass.

Informatica™, DataStage™, and Ab Initio™ Environments

With reference to the environment containing databases structured with data integration products available from the Informatica Corporation of Redwood City, Calif., the storage device 120/320 comprises an Informatica™ repository and the data objects 122 comprise mappings. Likewise, with reference to the environment containing a database structured as a DataStage™ repository, the data objects 122 comprise mappings. In addition, the elements 124 of the mappings in both types of environments comprise transformations and SQL overrides. With reference to the environment containing an Ab Initio™ managed database, the data objects 122 comprise graphs and the elements 124 of the graphs comprise transformations. Although the Informatica™, the DataStage™, and Ab Initio™ environment examples are described together, it should be understood that the processor(s) 310 may employ the examples separately depending upon the type of data repository from which the complexity information is obtained.

An example of a predefined schedule 500 of transformations 502 and point values 504 for an Informatica™ repository is depicted in FIG. 5A and an example of a predefined schedule 510 for a DataStage™ repository is depicted in FIG. 5B. The predefined schedule of transformations 502 and point values for an Ab Initio™ repository may be similar to the predefined schedules 500 and 510 depicted in FIGS. 5A and 5B. Either or both of the predefined schedules 500 and 510 may be stored, for instance, as a lookup table in the storage device 320 and the processor(s) 310 may access the predefined schedule 500/510 in assigning points to the selected elements 124 at step 410 in the method 400. The listing of transformations 502 and point values 504 in the predefined schedule 500 of FIG. 5A and the listing of transformations 512 and point values 514 in FIG. 5B are intended to provide particular examples of suitable predefined schedules 500 and 510 and are thus not intended to limit a scope of the invention to the transformations 502/512 and points 504/514 depicted therein. It should thus be understood that the predefined schedules 500 and 510 may include additional transformations 502/512 or existing transformations 502/512 may be removed or replaced and the points 504/514 may also vary from that shown in FIGS. 5A and 5B, without departing from a scope of the invention.

According to an embodiment, the transformations 502 (512) contained in the predefined schedule 500 (510) comprise all of the transformations 502 (512) forming the mappings (data objects 122) for a particular database. In another embodiment, the predefined schedule 500 (510) includes a selected set of transformations 502 (512), for instance, those transformations 502 (512) that a user has identified as being the most relevant to a particular database, as discussed above. In addition, a user may define the points 504 (514) assigned to each of the transformations 502 (512) based upon knowledge gained from previous interactions with the mappings (graphs) or data objects 122 of a particular database.

With reference back to the method 400, the processor(s) 310 accesses the predefined schedule 500 (510) at step 410 to assign scores for the transformations 502 (512) and calculates scores for the retrieved mappings (graphs) by applying a mathematical function to the selected transformations 502 (512) and the assigned points 504 (514) at step 412. By way of particular example, the processor(s) 310 determines the transformations 502 (512) and the numbers of each of the transformations 502 (512) contained in each of the mappings or graphs (data objects 122), for instance, from a mapping detail sheet (not shown) that identifies each of the mapping names of a computing job and a SQL override summary sheet (not shown) that identifies which of the mappings have used SQL overrides. The mapping detail sheet provides detailed information about each of the mappings, such as folder name, workflow name, session name, mapping name, transformation associated with the mappings, a count of the transformation type used in the mapping, etc. The SQL override summary sheet provides information such as the folder name relating to the computing job on which the complexity estimation is being performed, the mapping names where SQL overrides exists, the types of transformations used for overriding purposes, the SQL override statement used in the transformation, etc. According to an embodiment, the mapping detail sheet and the SQL override summary sheet are created through implementation of the method 450.

In addition, for each of the mappings or graphs (data objects 122), the processor(s) 310 multiplies the number of each of transformations 502 (512) with their assigned points 504 (514) and sums the products. Thus, for instance, with respect to the predefined schedule 500, if a mapping (graph) has 2 sources, 2 source qualifiers, 1 update strategy, 3 aggregators, 1 joiner, 1 expression and 1 target, at step 412, the score (N) for that mapping will be calculated as:

$$N=2*0+2*0+1*2+3*2+1*2+1*1+1*0=11 \quad \text{Equation (1):}$$

The processor(s) 310 may perform a similar process to determine the respective scores for the transformations 512 depicted in the predefined schedule 510.

In addition, at step 410, the processor(s) 310 assigns a score for the SQL overrides (data objects 122) according to a predefined schedule 520, depicted in FIG. 5C. Similarly to the predefined schedules 500 and 510 depicted in FIGS. 5A and 5B, the predefined schedule 520 for the SQL overrides may be stored, for instance, as a lookup table in the storage device 320 and the processor(s) 310 may access the predefined schedule 520 in assigning points to the selected SQL lengths 522 (elements 124) at step 410 in the method 400. The listing of SQL override lengths 522 and associated point values 524 in the predefined schedule 520 is intended to provide one particular example of a suitable predefined schedule 520 and is thus not intended to limit a scope of the invention to the actual relationships depicted therein. It should thus be understood that the predefined schedule 520 may include additional SQL override length 522 ranges or existing SQL override length 522 ranges may be removed or replaced and the points 524 may also vary from that shown in FIG. 5C, without departing from a scope of the invention.

According to an embodiment, the point values 524 assigned to the SQL overrides 522 are based upon the lengths of the SQL overrides 522. The lengths of the SQL overrides 522 are calculated from the "from" clause to the end of the "select" statement as it is specified in the SQL override option of a source qualifier and look up transformation. In addition, a user may define the points 524 assigned to each of the SQL override lengths 522 based upon knowledge gained from previous interactions with the SQL overrides (data objects 122) of a particular database.

With reference back to the method 400, the processor(s) 310 accesses the predefined schedule 520 at step 410 and calculates scores for the retrieved SQL override 522 by applying a mathematical function to the SQL override 522 and the assigned points 524 at step 412. By way of particular example, the processor(s) 310 determines the length of the SQL override 522 and based upon a comparison function of where the length falls in the SQL length ranges, the processor(s) 310 assigns the corresponding point value 524 to the SLQ override.

The scores (N) for each of the mappings (graphs) retrieved at step 406 may be calculated in manners similar to those described above. In addition, scores for each of the mappings (graphs) may comprise a combination of the scores calculated for the transformations and for the SQL overrides associated with each of the mappings (graphs). For instance, the scores of the transformations 502/512 may be added to the scores of the SQL overrides 522 to obtain a total score for the mappings or graphs (data objects 122).

The processor(s) 310 estimates the respective complexities of the mappings or graphs (data objects 122), as indicated at step 414. More particularly, for instance, the processor(s) 310 identifies the points assigned to each of the mappings or graphs, which includes both the transformations and the SQL overrides, and estimates a complexity based upon the points. The processor(s) 310 may estimate the complexities of the mappings or graphs based upon a complexity schedule. An example of a suitable complexity schedule 530 is depicted in FIG. 5D. Similarly to the predefined schedules 500, 510, and 520 depicted in FIGS. 5A-5C, the complexity schedule 530 may be stored, for instance, as a lookup table in the storage device 320 and the processor(s) 310 may access the complexity schedule 530 in estimating complexities of the mappings or graphs (data objects 122) at step 414 in the method 400. The listing of points ranges 532 and associated complexities 534 in the complexity schedule 530 is intended to provide one particular example of a suitable complexity schedule 530 and is thus not intended to limit a scope of the invention to the actual relationships depicted therein. It should thus be understood that the complexity schedule 530 may include additional ranges 532 and that the existing ranges 532 may be removed, replaced, and/or modified and that the assignment of the complexities 534 may also vary from that shown in FIG. 5D, without departing from a scope of the invention.

According to an embodiment, the processor(s) 310 is configured to accumulate the complexities of the mappings (graphs) and to provide a summary of the complexities of each of the mappings (graphs). For instance, the processor(s) 310 may create a spreadsheet containing a summary of the mappings (graphs) and their associated complexities. In addition, the processor(s) 310 may cause the spreadsheet to be displayed on a display to enable a user to identify how each of the mappings (graphs) has been categorized.

An example of a suitable summary spreadsheet 540 is depicted in FIG. 5E. As shown therein, the summary spreadsheet 540 identifies the folder name from which the mappings (graphs) are obtained, the names of the individual mappings (graphs), for instance, for a particular computing job, the transformation points and the SQL override points associated with each of the mappings (graphs), the total points associated with each of the mappings (graphs) and the complexity assigned for each of the mappings (graphs).

In addition, the processor(s) 310 estimates the complexity of the computing job based upon the respective complexities of the mappings (graphs) and the SQL overrides (data objects 122), as indicated at step 416. The processor(s) 310 may estimate the computing job complexity by applying a mathematical function to the complexity levels of the mappings (graphs). The mathematical function may be the median, mean, average, the highest estimated complexity level, the lowest estimated complexity level, etc., of the estimated complexities of the mappings or graphs (data objects 122).

Business Objects Environment

With reference now to a business objects environment containing universes and reports, the storage device 120/320 comprises a business objects (BO) repository. In addition, the data objects 122 comprise BO universes and BO reports. The elements 124 of the BO universes comprise universe components and the elements 124 of the BO reports comprise report components.

Generally speaking, the processor(s) 310 is configured to employ the method 400 in the BO environment to analyze the complexity of a computing job, in this case, a BO application comprised of BO universes and BO reports. In one embodiment, the complexity of the BO application may be used to calculate the full time employees and resources required in a knowledge transfer of an application or an application outsourcing project. In one respect, the complexity of the existing BO universes and BO reports may be useful while estimating resources and the size/effort of change/problem requests in a support project.

The processor(s) 310 is configured to identify and retrieve selected BO universes and BO reports (data objects 122) at steps 404 and 406. The BO reports may comprise Deski and Webi reports, for instance, and may have been created through implementation of the method 450. The selection of the BO universes and BO reports at step 404 may be based upon a historical knowledge of the relevance of the BO universes and BO reports to a particular BO repository as discussed above with respect to step 404 in FIG. 4. In addition, at step 408, the processor(s) 310 is configured to select universe components and report components (elements 124). As described above, again with respect to FIG. 4, the universe components and report components selected at step 408 may be based upon a historical knowledge of the relevance of each of the universe components and report components to their respective BO universes and BO reports.

An example of a predefined schedule 600 of universe components 602, points (percentages) 604, and complexity levels 606 is depicted in FIG. 6A. In addition, an example of a predefined schedule 610 of report components 612, points (percentages) 614, and complexity levels 616 is depicted in FIG. 6B. The predefined schedules 600 and 610 may be stored, for instance, as lookup tables in the storage device 320 and the processor(s) 310 may access the predefined schedules 600 and 610 in assigning points to the selected universe components 602 (elements 124) and the selected report components 612 at step 410 in the method 400. The listing of universe components 602 and points 604 in the predefined schedule 600 and report components 612 and points 614 in the predefined schedule 610 is intended to provide particular examples of suitable predefined schedules 600 and 610 and is thus not intended to limit a scope of the invention to the universe components 602 and points 604 and report components 612 and points 614 depicted therein. It should thus be understood that the predefined schedules 600 and 610 may include additional universe components 602 (report components 612) or existing universe components 602 (report components 612) may be removed or replaced and the points 604 (points 614) may also vary from that shown in FIG. 6A, without departing from a scope of the invention. The predefined schedules 600 and 610 may also include a greater or a lesser number of complexity designations that what is shown therein, without departing from a scope of the invention.

The predefined schedule 600 includes a column containing the number of respective universe components 602 contained in a BO universe (data object) and a column containing the points 604 assigned to each of the universe components 602. The predefined schedule 600 also includes three columns 606 that identify when each of the number of respective universe components 602 is considered to have a simple, medium, or complex complexity.

As shown in the columns that define the respective complexity levels, the complexities of the universe components 602 are defined based upon differing thresholds. For instance, with respect to the first universe component 602, the universe component pertaining to tables/views is considered to have a simple complexity when the number of tables/views is between 0-20, a medium complexity when the number of tables/views is between 21-30, and a complex complexity when the number of tables/views is greater than 30. In addition, the remaining universe components 602 are considered to have a simple, medium, and complex complexity levels under differing thresholds of numbers as compared with the first universe component 602.

The threshold values for determining the complexity levels 606 of each of the universe components 602 and the points 604 assigned to the universe components 602 may be based upon a historical knowledge of the relevance of each of the universe components 602 to the BO universe (data object 122). As such, the threshold values for the complexity levels 606 and the point values 604 may be user-defined and may also vary for different BO universes and applications.

The predefined schedule 610 includes a column containing the number of respective report components 612 contained in a BO universe (data object) and a column containing the points 614 assigned to each of the report components 612. The predefined schedule 610 also includes three columns 616 that identify when each of the number of respective report components 612 is considered to have a simple, medium, or complex complexity.

As shown in the columns that define the respective complexity levels, the complexities of the report components 612 are defined based upon differing thresholds. For instance, with respect to the first report component 612, the report component pertaining to tables/views is considered to have a simple complexity when the number of tables/views is between 0-2, a medium complexity when the number of tables/views is between 3-6, and a complex complexity when the number of tables/views is greater than 6. In addition, the remaining report components 612 are considered to have simple, medium, and complex complexity level designations under differing thresholds of numbers as compared with the first report component 612.

The threshold values for determining the complexity levels 616 of each of the report components 612 and the points 614 assigned to the report components 612 may be based upon a historical knowledge of the relevance of each of the report components 612 to the BO reports (data object 122). As such, the threshold values for the complexity levels 616 and the point values 614 may be user-defined and may also vary for different BO reports and applications.

With respect to the method 400, at step 410, the processor(s) 310 assigns respective points 604 to each of the universe components 602 based upon the predefined schedule 600 and the respective points 614 to each of the report components 612 based upon the predefined schedule 610. In addition, at step 412, the processor(s) 310 calculates scores for each of the universe components 602 contained in the BO universe by determining the numbers of each of the identified universe components in the BO universe and for each of the report components 612 contained in the BO report by determining the numbers of each of the identified report components in the BO report. As such, the processor(s) 310 may perform an initial step of identifying the universe components and counting each instance of the universe components and identifying the report components and counting each instance of the report components.

The processor(s) 310 also estimates complexities of the BO universes (data objects 122) based upon the complexity designations of the respective universe components 602 and their assigned points (percentages) 604 and the BO reports (data objects 122) based upon the complexity designations of the respective report components 612 and their assigned points (percentages) 614, as indicated at step 414. As such, for example, the first universe component 602 (tables/views) may be identified as having a medium complexity and the second universe component (classes) may be identified as having a simple complexity. In this example, the medium complexity designation is weighted at 25% and the simple designation is weighted at 3% of the total complexity level. In addition, the processor(s) 310 may use the weighted complexity designations of each of the universe components 602 and the report components 612 to identify the complexity of the BO universe containing the universe components 602 and the BO report containing the report components 612. For instance, the processor(s) 310 may estimate the complexity of the BO universe to be equivalent to a weighted average of the complexity designations of the universe components 602 and the complexity of the BO report to be equivalent to a weighted average of the complexity designations of the report components 612.

The processor(s) 310 may further estimate a complexity of the computing job based upon the complexities of one or more of the BO universes and BO reports (data objects 122), at step 416. For instance, the processor(s) 310 may determine a complexity designation of the computing job based upon a weighted average of the complexities of the BO universes and BO reports. The complexity designation of the computing job is based upon a weighted average of the BO universes because the BO universes may have different levels of relevance with respect to the computing job and may thus be weighted differently from each other. Likewise, the complexity designation of the computing job is based upon a weighted average of the BO reports because the BO reports may have different levels of relevance with respect to the computing job and may thus be weighted differently from each other. The weighting of the BO universes and the BO reports may also be user-defined and may thus be based upon a historical knowledge of the various relevance levels of the BO universes and BO reports.

The processor(s) 310 may further estimate resources required to perform the computing job based upon the complexity of the computing job at step 416. Thus, by way of a particular example, the processor(s) 310 may employ the computing job complexity in determining the number of full time employees required to perform knowledge transfer of an application for an application outsourcing project.

According to an embodiment, the processor(s) 310 is configured to accumulate the complexities of the BO universes and the BO reports and to provide a summary of the complexities of each of the BO universes and BO reports. For instance, the processor(s) 310 may create a spreadsheet containing a summary of the universe components 602 and the report components 612 and their associated complexities. In addition, the processor(s) 310 may cause the spreadsheet to be displayed on a display to enable a user to identify how each of the BO universes and the BO reports have been categorized.

Computing Apparatus

Figure 7:
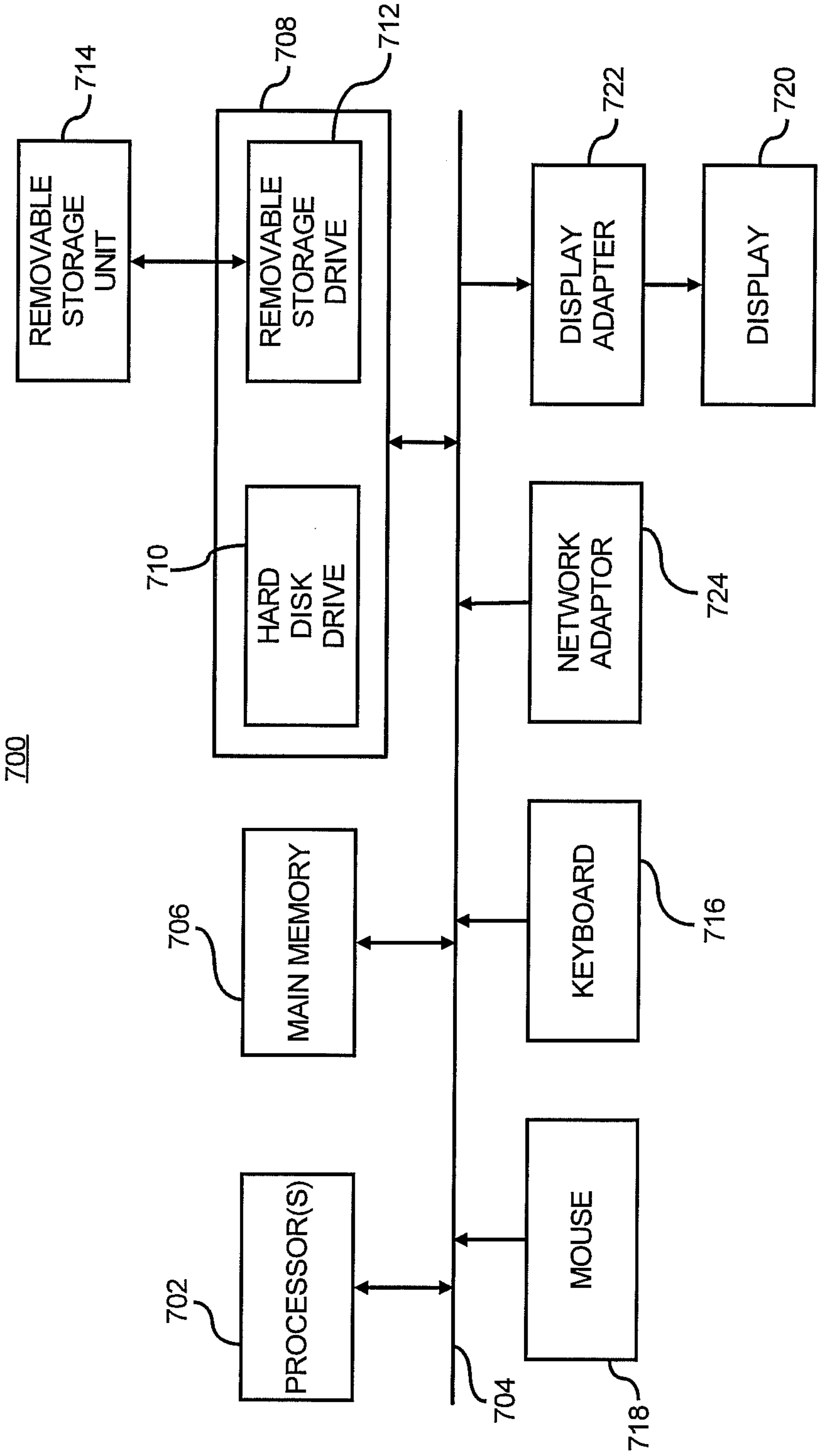
FIG. 7 illustrates a block diagram of a computing apparatus configured to implement or execute the methods depicted in FIGS. 4A and 4B, in accordance with an embodiment of the invention.

FIG. 7 illustrates a block diagram of a computing apparatus 700, such as the processing apparatus 302 depicted in FIG. 3, according to an example. In this respect, the computing apparatus 300 may be used as a platform for executing one or more of the functions described hereinabove with respect to the processing apparatus 302.

The computing apparatus 700 includes one or more processors 702, such as the processor(s) 310. The processor(s) 702 may be used to execute some or all of the steps described in the methods 400 and 450. Commands and data from the processor(s) 702 are communicated over a communication bus 704. The computing apparatus 700 also includes a main memory 706, such as a random access memory (RAM), where the program code for the processor(s) 702, may be executed during runtime, and a secondary memory 708. The secondary memory 708 includes, for example, one or more hard disk drives 710 and/or a removable storage drive 712, representing a floppy diskette drive, a magnetic tape drive, a compact disk drive, etc., where a copy of the program code for the methods 400 and 450 may be stored.

The removable storage drive 710 reads from and/or writes to a removable storage unit 714 in a well-known manner. User input and output devices may include a keyboard 716, a mouse 718, and a display 720. A display adaptor 722 may interface with the communication bus 704 and the display 720 and may receive display data from the processor(s) 702 and convert the display data into display commands for the display 720. In addition, the processor(s) 702 may communicate over a network, for instance, the Internet, LAN, etc., through a network adaptor 724.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A non-transitory computer readable storage medium on which is embedded one or more computer programs, said one or more computer programs implementing a method for estimating a complexity of a computing job for transformation of data objects related to a first application for compatibility with a second application, said one or more computer programs comprising computer readable code for:

retrieving selected data objects related to the first application from a data repository, wherein each of the selected data objects is formed of multiple elements, wherein the selected data objects comprise at least one of mappings and graphs, wherein the multiple elements of the at least one of mappings and graphs comprise transformations each representing a transformation of the selected data objects related to the first application for compatibility with the second application and Structured Query Language (SQL) overrides;

assigning points to the multiple elements according to a predefined schedule;

calculating scores for the selected data objects by calculating transformation scores for each of the at least one of mappings and graphs by multiplying the transformations by their respective points to obtain respective products, and summing the products, and calculating SQL override scores for each of the at least one of mappings and graphs by determining points assigned to each of the SQL overrides based upon length ranges of the SQL overrides, wherein mapping scores comprise sums of respective transformation scores and SQL override scores;

estimating complexities of the selected data objects for transformation of the selected data objects for compatibility with the second application based upon the calculated scores and the predefined schedule;

estimating a complexity of the computing job based upon the estimated complexities of the selected data objects;

estimating an amount of resources required to perform the computing job based upon the complexity of the computing job; and performing, based on the estimated amount of resources, the computing job to transform the selected data objects for compatibility with the second application.

2. The computer readable storage medium according to claim 1, said one or more computer programs further comprising computer readable code for:

receiving user input pertaining to a historical knowledge of the selected data objects; and creating the predefined schedule of points for the multiple elements, wherein the predefined schedule of points is developed from a historical knowledge of the selected data objects.

3. The computer readable storage medium according to claim 1, wherein the computer readable code for performing the computing job to transform the selected data objects for compatibility with the second application further comprises computer readable code for employing the estimated amount of resources in developing a bid for performing the computing job.

4. The computer readable storage medium according to claim 1, said one or more computer programs further comprising computer readable code for outputting a summary sheet of the estimated computing job complexity that depicts the estimated complexities of each of the selected data objects.

5. The computer readable storage medium according to claim 1, wherein estimating complexities of the selected data objects further comprises estimating complexities of the at least one of mappings and graphs based upon the scores of each of the at least one of mappings and graphs and wherein estimating the complexity of the computing job further comprises estimating the complexity of the computing job based upon a function of the estimated complexities of each of the at least one of mappings and graphs.

6. The computer readable storage medium according to claim 5, wherein estimating complexities of the at least one of mappings and graphs further comprises estimating the complexities of the at least one of mappings and graphs based upon where the scores for each of the at least one of mappings and graphs falls in a complexity schedule that relates ranges of scores to complexity values.

7. The computer readable storage medium according to claim 1, wherein for the selected data objects comprising the mappings, said one or more computer programs further comprising computer readable code for:

accessing an intelligence report;

identifying relevant data from the intelligence report, wherein the relevant data comprises the transformations and the SQL overrides of the mappings; and creating a spreadsheet with information pertaining to the relevant data, said spreadsheet facilitating retrieval of the selected data objects.

8. The computer readable storage medium according to claim 7, wherein identifying the relevant data further comprises identifying a summary count of the transformations and lengths of the SQL overrides, and wherein creating the spreadsheet further comprises creating the spreadsheet to include the summary count of the transformations and the lengths of the SQL overrides.

9. The computer readable storage medium according to claim 1, wherein the selected data objects further comprise business objects universes and business objects reports, and wherein the multiple elements further comprise universe components of the business objects universes and report components of the business objects reports.

10. The computer readable storage medium according to claim 9, wherein calculating scores for the selected data objects further comprises calculating scores for each of the universe components by determining the numbers of each of the respective universe components, and wherein estimating complexities of the business objects universes further comprises:

comparing the number of universe components to the predefined schedule to determine complexities of the respective universe components, wherein the predefined schedule includes a correlation between the numbers of respective universe components and a plurality of complexity designations;

multiplying the points assigned to each of the universe components by their respective complexity designations, wherein the predefined schedule further includes a correlation between the respective universe components and the points assigned to the respective universe components; and wherein estimating complexities of the selected data objects further comprises estimating the complexities of the business objects universes based upon the complexity designations of the respective universe components and the points assigned to the respective universe components.

11. The computer readable storage medium according to claim 9, wherein calculating scores for the selected data objects further comprises calculating scores for each of the report components by determining the numbers of each of the respective report components, and wherein estimating complexities of the business objects universes further comprises:

comparing the number of report components to the predefined schedule to determine complexities of the respective report components, wherein the predefined schedule includes a correlation between the numbers of respective report components and a plurality of complexity designations;

multiplying the points assigned to each of the report components by their respective complexity designations, wherein the predefined schedule further includes a correlation between the respective report components and the points assigned to the respective report components; and wherein estimating complexities of the selected data objects further comprises estimating the complexities of the business objects universes based upon the complexity designations of the respective report components and the points assigned to the respective report components.

12. The computer readable storage medium according to claim 9, said one or more computer programs further comprising computer readable code for:

accessing an intelligence report;

identifying relevant data from the intelligence report, wherein the relevant data comprises the universe components of the business objects universes and the report components of the report universes; and creating a spreadsheet with information pertaining to the relevant data.

13. The computer readable storage medium according to claim 12, wherein identifying the relevant data further comprises identifying a summary count of the universe components and the report components and wherein creating the spreadsheet further comprises creating the spreadsheet to include the summary count of the universe components and the report components.

14. A processing apparatus for estimating a complexity of a computing job for transformation of data objects related to a first application for compatibility with a second application, said processing apparatus comprising:

at least one processor;

a storage device in communication with the at least one processor, said storage device storing instructions that, when executed by the at least one processor, cause the at least one processor to:

retrieve selected data objects related to the first application from a data repository, wherein each of the selected data objects is formed of multiple elements, wherein the selected data objects comprise at least one of mappings and graphs, wherein the multiple elements of the at least one of mappings and graphs comprise transformations each representing a transformation of the selected data objects related to the first application for compatibility with the second application and Structured Query Language (SQL) overrides;

assign points to the multiple elements according to a predefined schedule;

calculate scores for the selected data objects by calculating transformation scores for each of the at least one of mappings and graphs by multiplying the transformations by their respective points to obtain respective products, and summing the products, and calculating SQL override scores for each of the at least one of mappings and graphs by determining points assigned to each of the SQL overrides based upon length ranges of the SQL overrides, wherein at least one of mapping scores and graphs scores comprise sums of respective transformation scores and SQL override scores;

estimate complexities of the selected data objects for transformation of the selected data objects for compatibility with the second application based upon the calculated scores and the predefined schedule;

estimate a complexity of the computing job based upon the estimated complexities of the selected data objects;

estimate an amount of resources required to perform the computing job based upon the complexity of the computing job; and perform, based on the estimated amount of resources, the computing job to transform the selected data objects for compatibility with the second application.

15. The processing apparatus according to claim 14, said storage device further storing instructions that, when executed by the at least one processor, cause the at least one processor to:

create the predefined schedule of points for the multiple elements from a user's historical knowledge of the selected data objects.

16. The processing apparatus according to claim 14, said storage device further storing instructions that, when executed by the at least one processor, cause the at least one processor to:

estimate complexities of the at least one of mappings and graphs based upon the scores of each of the at least one of mappings and graphs and wherein estimating the complexity of the computing job further comprises estimating the complexity of the computing job based upon a function of the estimated complexities of each of the at least one of mappings and graphs.

17. The processing apparatus according to claim 14, said storage device further storing instructions that, when executed by the at least one processor, cause the at least one processor to:

estimate complexities of the at least one of mappings and graphs based upon the scores of each of the at least one of mappings and graphs, and wherein estimating the complexities of the at least one of mappings and graphs further comprises estimating the complexities of the at least one of mappings and graphs based upon where the scores for each of the at least one of mappings and graphs falls in a complexity schedule that relates ranges of scores to complexity values.

18. The processing apparatus according to claim 14, wherein for the selected data objects comprising the mappings, said storage device further storing instructions that, when executed by the at least one processor, cause the at least one processor to:

access an intelligence report;

identify relevant data from the intelligence report, wherein the relevant data comprises the transformations and the SQL overrides of the mappings; and create a spreadsheet with information pertaining to the relevant data, wherein the spreadsheet facilitates retrieval of the selected data objects.

19. The processing apparatus according to claim 14, wherein the selected data objects further comprise business objects universes and business objects reports, and wherein the multiple elements further comprise universe components of the business objects universes and report components of the business objects reports.

20. The processing apparatus according to claim 19, said storage device further storing instructions that, when executed by the at least one processor, cause the at least one processor to:

calculate scores for each of the universe components by determining the numbers of each of the respective universe components; and estimate complexities of the business objects universes by, comparing the number of universe components to the predefined schedule to determine complexities of the respective universe components, wherein the predefined schedule includes a correlation between the numbers of respective universe components and a plurality of complexity designations;

multiplying the points assigned to each of the universe components by their respective complexity designations, wherein the predefined schedule further includes a correlation between the respective universe components and the points assigned to the respective universe components; and estimating the complexities of the business objects universes based upon the complexity designations of the respective universe components and the points assigned to the respective universe components.

21. The processing apparatus according to claim 19, said storage device further storing instructions that, when executed by the at least one processor, cause the at least one processor to:

calculate scores for each of the report components by determining the numbers of each of the respective report components; and estimate complexities of the business objects universes by, comparing the number of report components to the predefined schedule to determine complexities of the respective report components, wherein the predefined schedule includes a correlation between the numbers of respective report components and a plurality of complexity designations;

multiplying the points assigned to each of the report components by their respective complexity designations, wherein the predefined schedule further includes a correlation between the respective report components and the points assigned to the respective report components; and estimating the complexities of the business objects universes based upon the complexity designations of the respective report components and the points assigned to the respective report components.

22. The processing apparatus according to claim 19, said storage device further storing instructions that, when executed by the at least one processor, cause the at least one processor to:

access an intelligence report;

identify relevant data from the intelligence report, wherein the relevant data comprises the universe components of the business objects universes and the report components of the report universes; and create a spreadsheet with information pertaining to the relevant data.

23. The processing apparatus according to claim 22, said storage device further storing instructions that, when executed by the at least one processor, cause the at least one processor to:

identify a summary count of the universe components and the report components and create the spreadsheet to include the summary count of the universe components and the report components.

24. A method for estimating a complexity of a computing job for transformation of data objects related to a first application for compatibility with a second application, the method comprising:

retrieving selected data objects related to the first application from a data repository, wherein each of the selected data objects is formed of multiple elements, wherein the selected data objects comprise at least one of mappings and graphs, wherein the multiple elements of the at least one of mappings and graphs comprise transformations each representing a transformation of the selected data objects related to the first application for compatibility with the second application and Structured Query Language (SQL) overrides;

assigning points to the multiple elements according to a predefined schedule;

calculating scores for the selected data objects by calculating transformation scores for each of the at least one of mappings and graphs by multiplying the transformations by their respective points to obtain respective products, and summing the products, and calculating SQL override scores for each of the at least one of mappings and graphs by determining points assigned to each of the SQL overrides based upon length ranges of the SQL overrides, wherein at least one of mapping scores and graphs scores comprise sums of respective transformation scores and SQL override scores;

estimating complexities of the selected data objects for transformation of selected data objects for compatibility with the second application based upon the calculated scores and the predefined schedule;

estimating, by a processor, the complexity of the computing job based upon the estimated complexities of the selected data objects;

estimating an amount of resources required to perform the computing job based upon the complexity of the computing job; and performing, based on the estimated amount of resources, the computing job to transform the selected data objects for compatibility with the second application.

25. The computer readable storage medium according to claim 1, wherein the selected data objects comprise predetermined file extensions.

26. The computer readable storage medium according to claim 1, wherein the lengths of the SQL overrides are calculated from a from clause to an end of a select statement.

* * * * *